Oct. 27, 1942.　　　C. T. WALTER　　　2,299,958
SOAP APPARATUS
Filed Aug. 23, 1938　　　12 Sheets-Sheet 1

Charles T. Walter
INVENTOR

ATTEST-

BY
ATTORNEY

Oct. 27, 1942.                    C. T. WALTER                    2,299,958
                                  SOAP APPARATUS
                              Filed Aug. 23, 1938           12 Sheets-Sheet 2

Charles T. Walter
INVENTOR

ATTEST-

Oct. 27, 1942.                C. T. WALTER                 2,299,958
                              SOAP APPARATUS
                          Filed Aug. 23, 1938        12 Sheets-Sheet 3
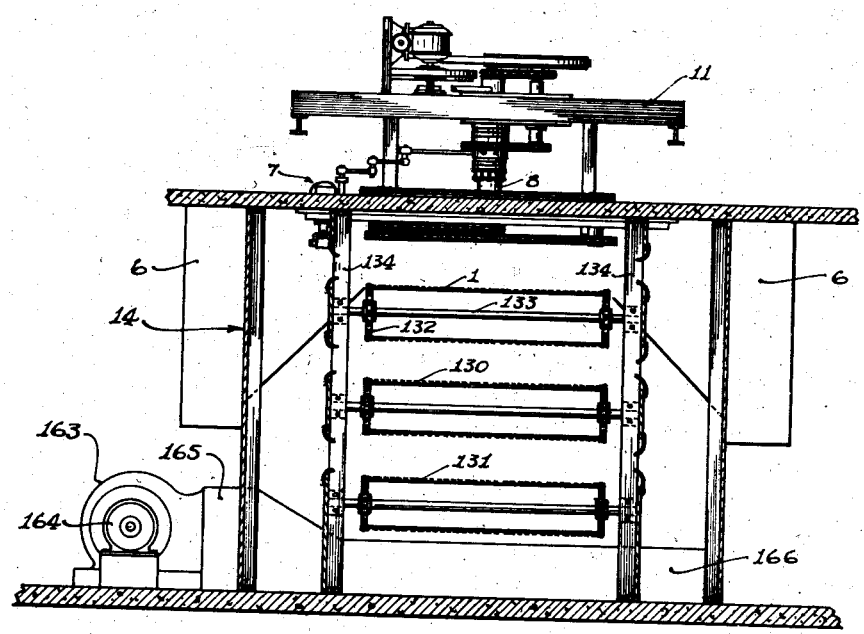
Fig. 3
ATTEST -
Norbert E. Birch
Wm C. Meiser
Charles T. Walter
INVENTOR
BY 
ATTORNEY Oct. 27, 1942.      C. T. WALTER      2,299,958
SOAP APPARATUS
Filed Aug. 23, 1938      12 Sheets-Sheet 4
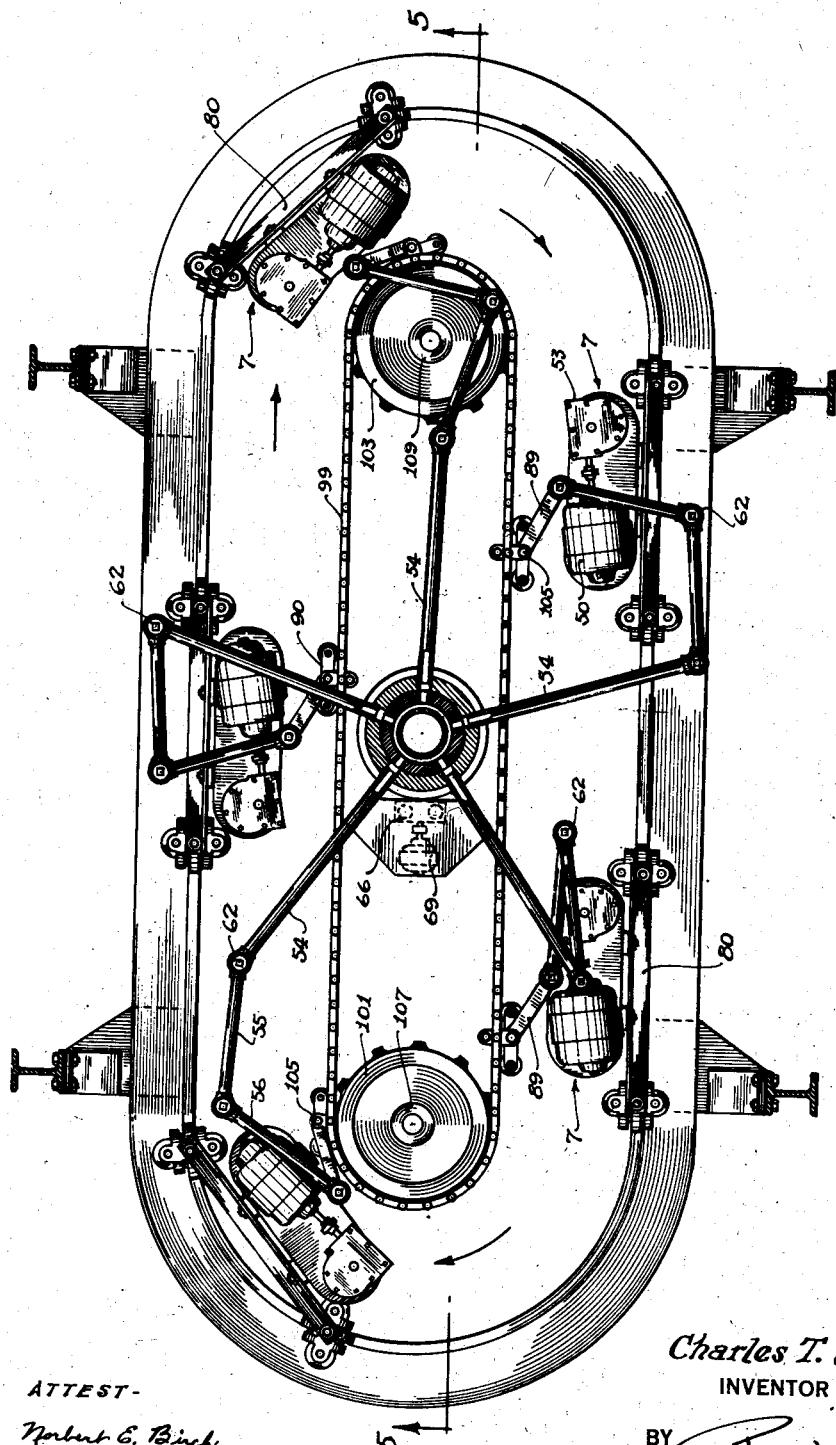
Fig. 4
ATTEST-
Charles T. Walter
INVENTOR
BY 
ATTORNEY Oct. 27, 1942.   C. T. WALTER   2,299,958
SOAP APPARATUS
Filed Aug. 23, 1938   12 Sheets-Sheet 6

Charles T. Walter
INVENTOR

ATTEST -
BY
ATTORNEY

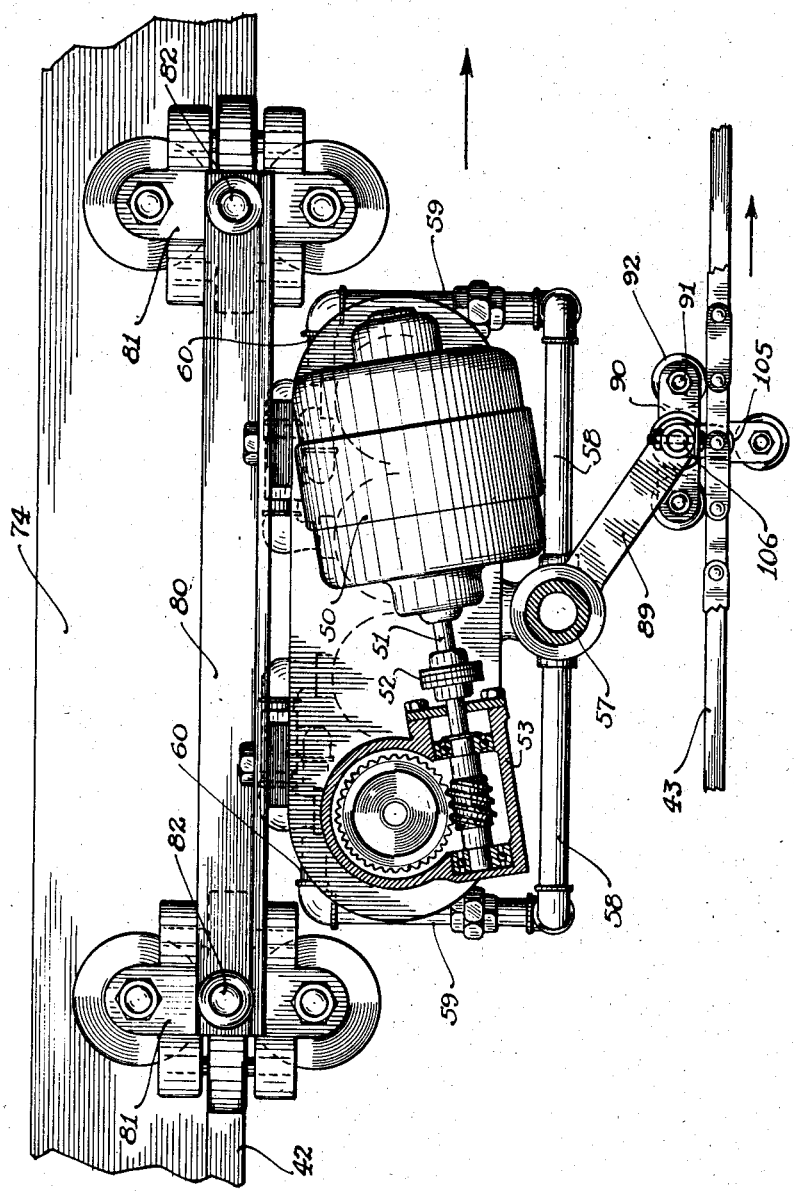

Oct. 27, 1942.   C. T. WALTER   2,299,958
SOAP APPARATUS
Filed Aug. 23, 1938   12 Sheets-Sheet 10

Charles T. Walter
INVENTOR

ATTEST-
BY
ATTORNEY

Oct. 27, 1942.　　　C. T. WALTER　　　2,299,958
SOAP APPARATUS
Filed Aug. 23, 1938　　　12 Sheets-Sheet 12

Charles T. Walter
INVENTOR

ATTEST

Patented Oct. 27, 1942

2,299,958

UNITED STATES PATENT OFFICE 2,299,958

SOAP APPARATUS

Charles T. Walter, Chicago, Ill., assignor to Industrial Patents Corporation, Chicago, Ill., a corporation of Delaware Application August 23, 1938, Serial No. 226,331

20 Claims. (Cl. 34—38)

This invention relates to an improved method and means for extruding and drying plastic material.

The device of the present invention is adapted for use in the manufacture of soap, such as is described and claimed in my copending applications, Serial No. 178,779, filed December 8, 1937, entitled Soap product, which issued June 4, 1940, as Patent No. 2,202,973, and Serial No. 178,780, filed December 8, 1937, entitled Ribbon soap, which issued June 4, 1940, as Patent No. 2,202,974.

One of the objects of the invention is to provide an improved means for extruding plastic stock.

Another object of the invention is to provide an improved means for extruding and drying plastic stock.

Another object of the invention is to provide an improved means for placing plastic stock on a conveyor for conditioning.

Another object of the invention is to provide a novel method of preparing plastic stock in the form of tubes, ribbons or the like.

Other objects of the invention will be apparent from the description and claims which follow.

The extrusion nozzles or dies disclosed herein by way of illustration, are described and claimed in my Patent No. 2,043,682, issued June 9, 1936, entitled Extrusion device.

In my prior patent, No. 2,043,681, issued June 9, 1936, entitled Drier conveyor, I have described and claimed the method of and means for drying plastic material extruded in continuous strings which comprises placing simultaneously a transverse series of strings of the plastic material in a zigzag path on a moving conveyor lengthwise thereof.

The present invention contemplates the method of and means for extruding and drying strand lengths of plastic material which comprises placing simultaneously a series of substantially parallel strands of the plastic material onto a moving conveyor transversely of the path of movement of the conveyor and thereafter drying the strands.

The present invention contemplates the ideal arrangement wherein each strand of the extruded material lies on the conveyor in a position such that it just touches the strands on either side. In other words, it is intended, in the practice of the present invention, to provide a single layer of extruded strands covering substantially the entire conveyor surface and without the extruded strands piling one on top of the other.

In the practice of the present invention, the strands are extruded from moving extruder devices which travel in succession transversely of the conveyor. The speed of travel of the extruders is relatively rapid as compared with the speed of the conveyor, whereby each extruder in traveling across the conveyor lays down a group of parallel strands substantially at right angles to the conveyor. As a result, the groups of strands deposited by the successive extruders will lay substantially parallel to each other, and the extruders may be adjusted so that the strands on the edges of each group may touch or overlap slightly. The overlapping or crossing of the strands is insufficient to interfere with the operation because the strands are so light that the formation in part of double layers does not cause damage to the strands or impair the drying.

Reference is had to the drawings which are diagrammatic and in which like characters of reference are used to designate similar elements.

Figure 3 is a view, partly in section, taken substantially on line 3—3 of Figure 2.

Figure 4 is a view in plan of the extrusion means taken substantially on line 4—4 of Figure 5.

Figure 9 is an enlarged view in plan showing one of the series of extrusion nozzles and the drive means therefor.

The present invention is concerned with the extrusion and drying of strands of plastic material in the form of tubes, ribbons or the like. The strands are deposited onto a movable conveyor substantially at a right angle to the path of movement of the conveyor, and thereafter are carried on the conveyor through a drying zone. The invention contemplates the use of one or more batteries of extrusion nozzles movable in an elliptical path above the moving conveyor, each battery of extrusion nozzles being adapted to deposit simultaneously onto the conveyor a series of strands of the plastic material arranged side by side and substantially at a right angle to the path of movement of the conveyor.

Figure 1:
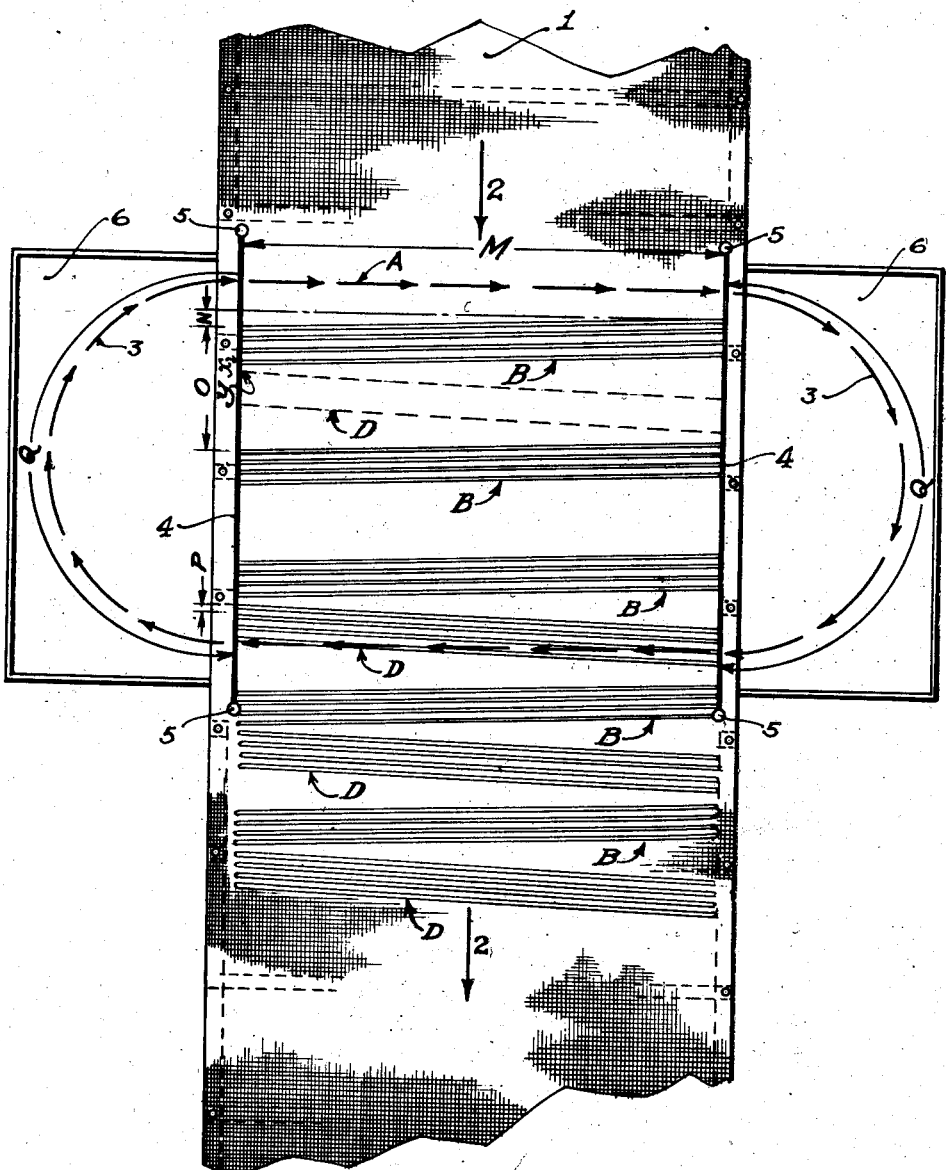
Figure 1 is an enlarged fragmentary view of the conveyor section showing diagrammatically the path of movement of the extrusion means and also the pattern formed by the extruded strands deposited on the conveyor.

Figure 1 shows a section of a drier conveyor and illustrates diagrammatically the path of movement of the batteries of extrusion nozzles thereover. The conveyor I moves in the direction indicated by the arrow designated by the numeral 2. The batteries of extrusion nozzles move in an elliptical path 3 in the direction indicated by the arrows. The number of nozzles employed in each battery of nozzles is optional. In the device of the present invention, four nozzles are used in each battery. The extrusion of the material from the nozzles is continuous and as the successive batteries of nozzles traverse the arm A of the elliptical path 3 there is deposited onto the conveyor I alternately spaced groups of four strands B of the plastic material.

In the construction of the device, the individual batteries of the nozzles are suitably spaced one from the other and the movement of the conveyor is so synchronized with the movement of the nozzles that the spacing between the groups of strands B is equal at least to the width of the group or series of strands B but it may in some instances be greater than the width of a group B. Furthermore, the successive batteries of nozzles as they traverse the arm C of the elliptical path 3 will deposit a group of strands D in the spaces intervening between the groups of strands B.

It will be apparent that the material extruded from the nozzles will flow downwardly onto the conveyor and as the conveyor moves forwardly while the nozzles move transversely across the conveyor, the strand will be laid somewhat diagonally across the surface thereof. As above stated, the speeds may be so correlated that the extruded strand may be laid across the conveyor at substantially a right angle to the direction of movement of the conveyor and as shown in Figure 1, only a slight turning away from the right angle results when the conveyor moves relatively slowly. By suitable mechanical design, it is possible that the strand could be laid across the conveyor at exactly right angles to the path of movement of the conveyor.

The extrusion of the material from the nozzles is continuous. Therefore, there is provided at each of the side edges of the conveyor I a continuous wire 4 extended to either side of the elliptical path 3. The wires 4 are secured at each of their ends in electrodes 5 and are electrically heated so that as each strand of the material passes over the wires 4, it is immediately melted, whence it is seen the curved ends of the strands are separated from the straight portions of the strands deposited onto the conveyor I. The separated ends of the strands fall into hoppers 6 and are returned to the melting kettle.

The batteries 7 of nozzles 44 are mounted for movement about a fixed column 8, rigidly secured as by key 9 within cross member 10 of framework 11. The framework 11 is rigidly secured above opening 12 in top 13 of drier housing 14.

Figure 5:
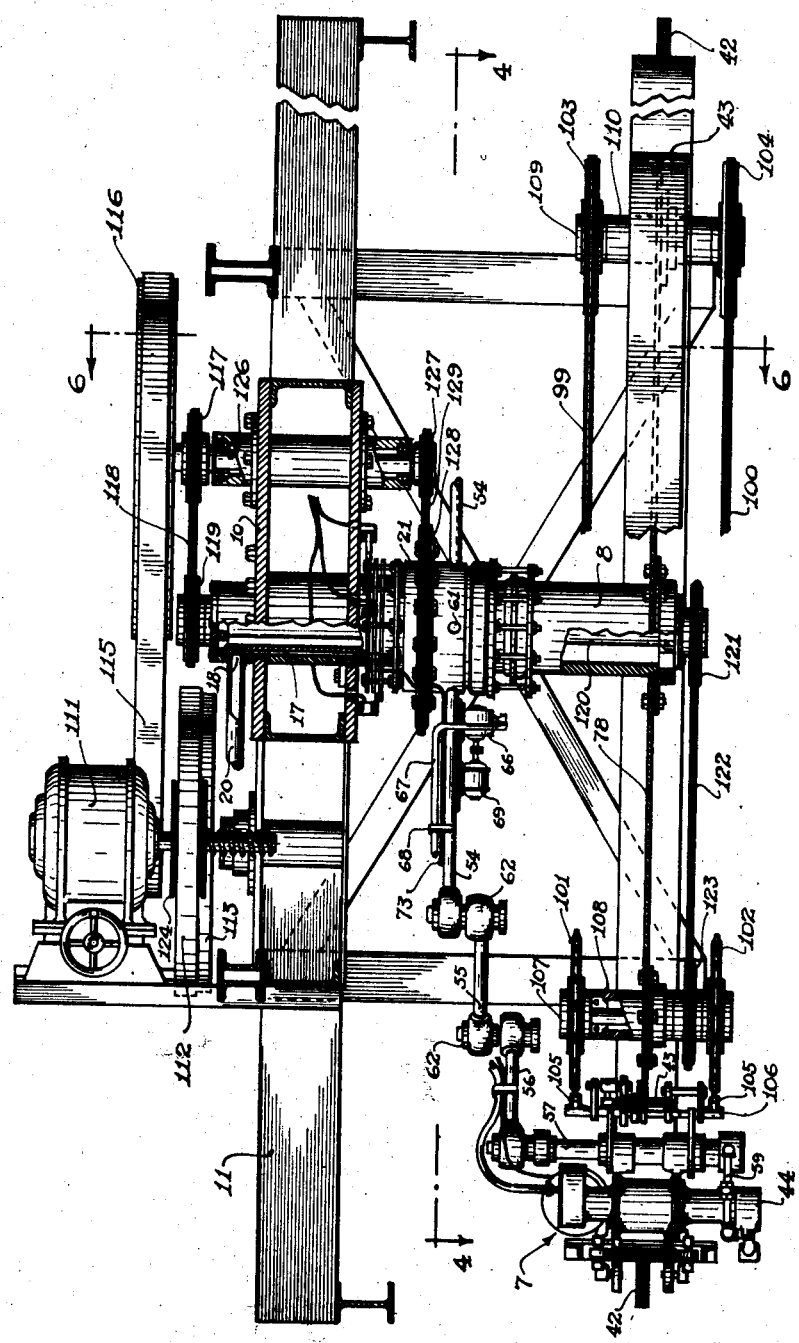
Figure 5 is an enlarged fragmentary view taken substantially on line 5—5 of Figure 4.
Figure 6:
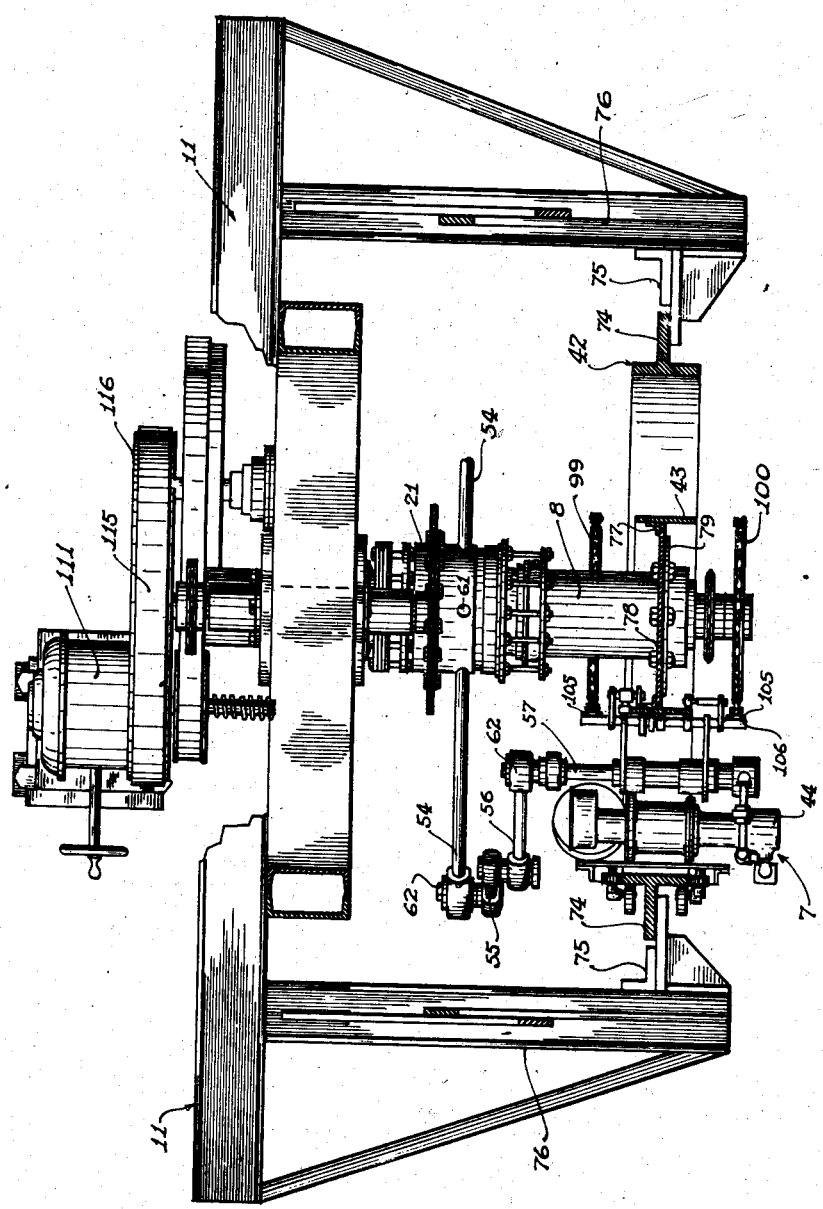
Figure 6 is a front view, partly in section, of the extrusion means.
Figure 7:
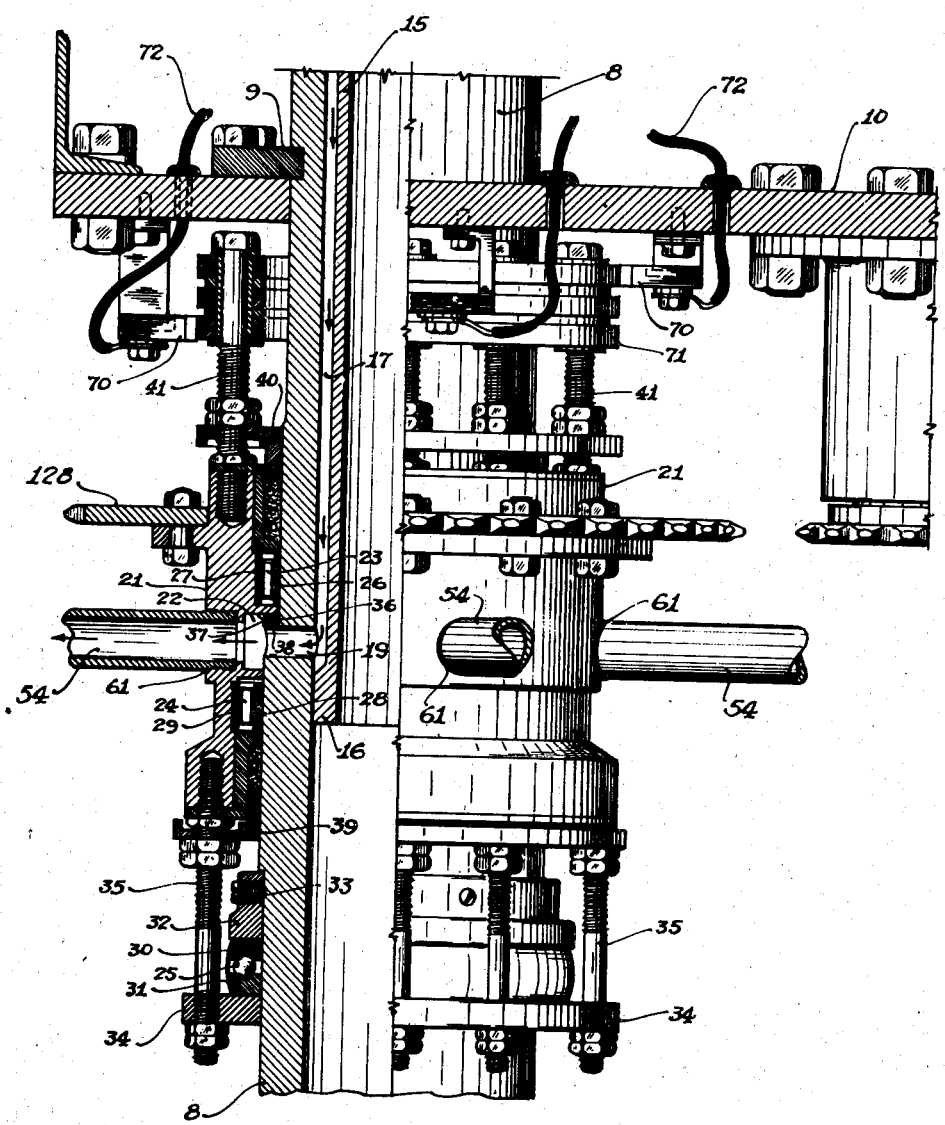
Figure 7 is an enlarged fragmentary view, partly in section, showing the central column for supporting the extrusion means.

Column 8 is shown in detail in Figures 5, 6 and 7. Liner 15 is provided at each of its ends with annular shoulders 16 having a press fit against the inner wall of column 8. Liner 15 is rigidly secured within column 8 and provides an annular space 17 connecting material inlet 18 with a plurality of outlets 19. The plastic material under pressure from a source not shown, is carried through line 20 to inlet 18, whence it passes through space 17 and outlets 19.

Collar 21 is provided with annular groove 22 and is rotatably mounted on column 8 with the groove 22 communicating with the outlets 19. Collar 21 is rotated on bearings 23 and 24, of the quill type, and open race bearing 25. Bearings 23 and 24, respectively, rotate within races 26 and 27, and 28 and 29 respectively secured against the outer wall of column 8 and the inner wall of collar 21. Bearing 25 comprises races 30 and 31. Race 30 is thrust against flange 32 rigidly secured as by screws 33 against the outer wall of column 8. Race 31 is thrust against member 34 adjustably secured to collar 21 as by bolts 35. Collar 21 bears also, as at 36, against bearing band 37, secured against shoulder 38 on the outer periphery of column 8.

Leakage from between column 8 and collar 21 is prevented by packing glands 39 and 40 respectively secured to collar 21 as by bolts 35 and 41.

Figure 10:
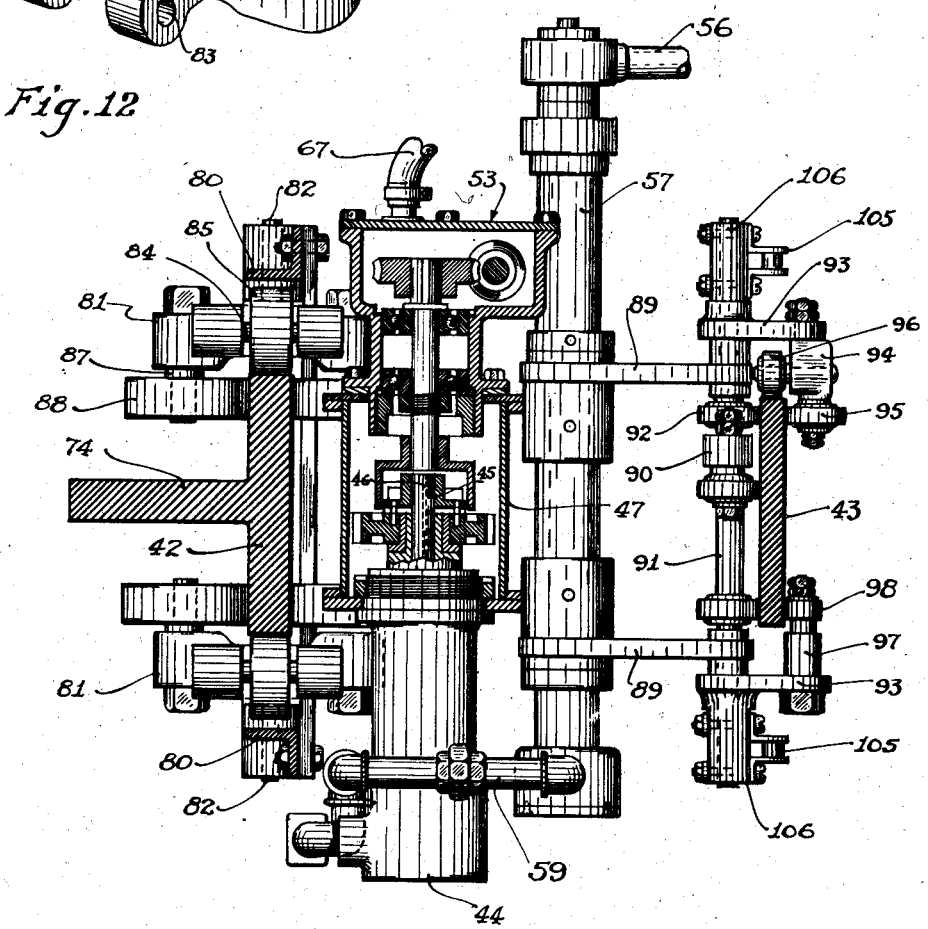
Figure 10 is a side view of Figure 9.
Figure 11:
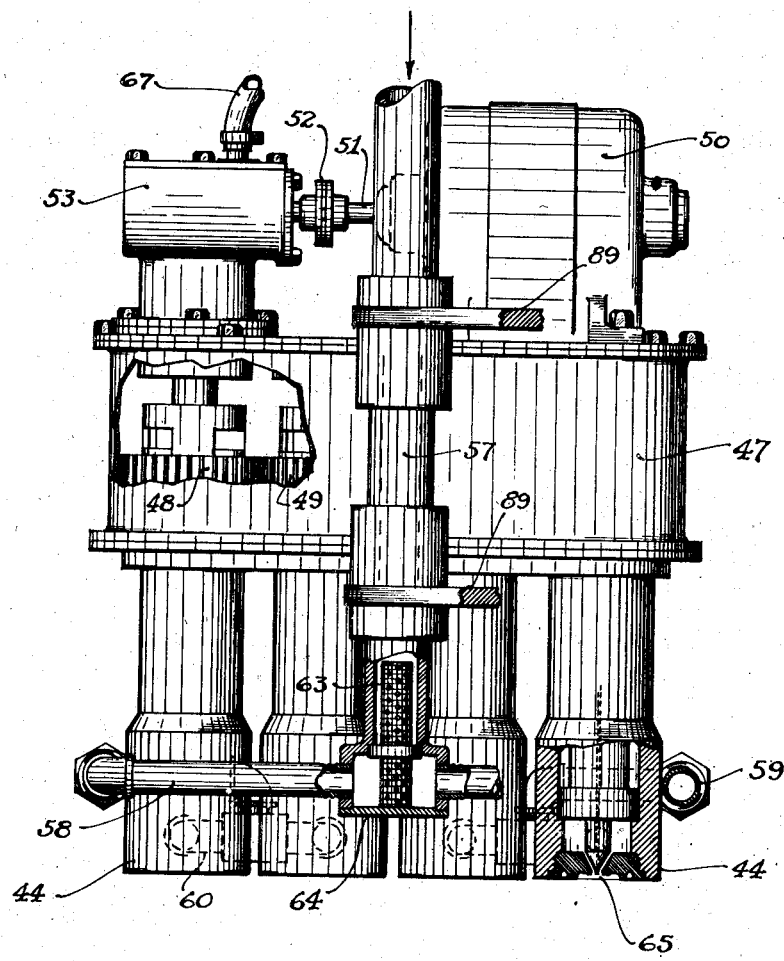
Figure 11 is another side view of Figure 9.

The batteries 7 of extrusion nozzles 44, as is more clearly shown in Figures 9, 10, and 11, are mounted for movement about column 8 upon trolley tracks 42 and 43, which tracks define the elliptical path 3.

The present invention employs five batteries 7 of extrusion nozzles 44. The number of nozzles per battery and the number of batteries employed in the machine, of course, may be altered.

The nozzles 44 are of the type described and claimed in my said Patent No. 2,043,682. The nozzles 44 employ a rotatable spindle 45, provided with breather opening 46 and may be used for forming strands in the form of tubes, ribbons, or the like.

The nozzles 44 are rigidly secured in vertical alignment below gear housing 47, the spindles 45 being driven one through the other as by gears 48 and 49 mounted in housing 47. The gear 48 is rotated by power transmitted from motor 50 through the medium of shaft 51, flexible coupling 52 and gear box 53. The motor 50 and gear box 53 are rigidly mounted on housing 47. The plastic material under pressure is delivered to each of the nozzles 44 through main lines 54, 55, 56 and 57, and branch lines 58, 59 and 60. Line 54 communicates with radial groove 22 in collar 21 at one of the openings 61. The lines 54, 55, 56 and 57 are interconnected as by joints 62 of the type described and claimed in my patent, No. 2,083,970, issued June 15, 1937, entitled Pipe joint. It will be seen that the lines 54, 55, 56 and 57 and their interconnecting joints 62 permit universal expansion and contraction of the material conduit between collar 21 and batteries 7 of extrusion nozzles 44 during movement of the nozzles 44 about the elliptical path 3.

Filter screen 63 is inserted within line 57 to screen the material before passage into the nozzles 44. Screen 63 may be removed for cleaning through clean out plug 64. The material is extruded from the several nozzles 44 through die openings 65.

The gear boxes 47 are preferably air tight. When it is desired to extrude the strands in the form of tubes, compressed air is supplied to boxes 47 for passage through breather openings 46 by blower 66 through flexible line 67 carried against the lines 54, 55 and 56 as by clamps 68.

The power to each of the motors 50 for driving the spindles 45 and motor 69 for operating the blower 66, is transmitted through flexible brushes 70 in contact with circular commutators 71. The brushes 70 are fixedly secured on cross member 10 and the circular commutators 71 are fixedly secured on collar 21 and rotate therewith. The wires 72 connect the brushes 70 with a source of electrical power not shown. The wires 73 connect the commutators 71 with each of the motors 50 and 69. The wires 73 connecting the motors 50, like flexible line 67, may be secured against the lines 54, 55 and 56 by clamps 68.

Figure 12:
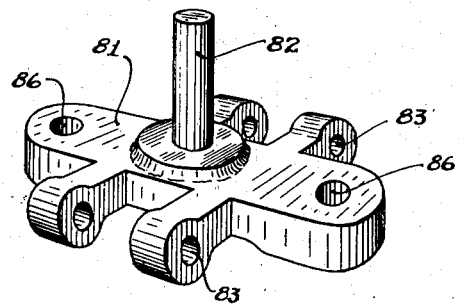
Figure 12 is a perspective view showing one of the trucks mounting one of the series of extrusion nozzles.

As shown in Figures 6 and 10, the track 42 is rigidly secured as by web 74 to angles 75 which are, in turn, rigidly secured to uprights 76 of framework 11. Track 43 is rigidly secured as by angles 77 and members 78 to annular flange 79 rigidly secured to fixed column 8. The tracks 42 and 43 define an elliptical space for movement of the batteries 7 of nozzles therebetween as defined by the elliptical path 3. The batteries 7 of nozzles are mounted for movement on track 42 as by upper and lower arms 80 provided at each of their ends with pivot trucks 81, which, in turn, provide roller surfaces against the track 42. One of the trucks 81 is more specifically shown in Figure 12. The truck 81 pivots on arm 82. Openings 83 secure shafts 84 and roller bearings 85 for movement against the outer edge of track 42. Openings 86 secure stub shafts 87 and rollers 88 for movement against the opposite side surfaces of track 42. It will be noted that the employment of a truck 81 at either end of upper and lower arms 80 firmly secures the batteries 7 of nozzles against vertical and side movement on track 42.

The batteries 7 of nozzles 44 are movably secured on the track 43 as by arms 89 and bearing brackets 90. Bearing brackets 90 carry vertical shafts 91 provided with spaced rollers 92 engageable against the inner surface of track 43. The brackets 90 also carry upper and lower arms 93. The upper arm 93 is provided with knuckle 94 carrying roller 95 engageable against the outer surface of track 43 and roller 96 engageable against the upper edge of track 43. The lower arm 93 is provided with stub shaft 97 carrying roller 98 engageable against the outer surface of track 43.

Figure 8:
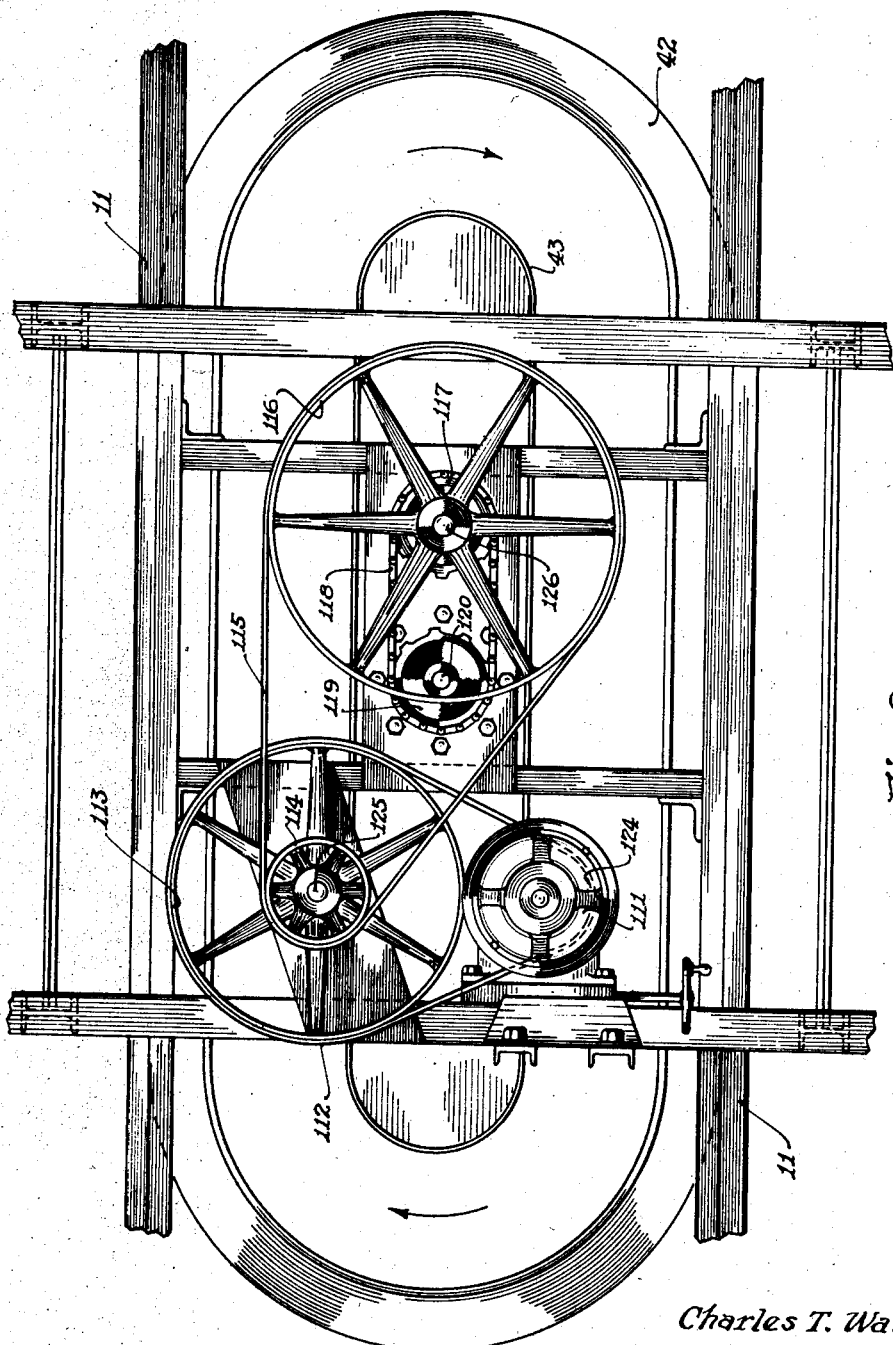
Figure 8 is a view in plan showing the means for driving the extrusion means.

The batteries 7 of nozzles are carried through the elliptical path defined by tracks 42 and 43, by chains 99 and 100, mounted respectively for movement on drive sprockets 101 and 102 and idler sprockets 103 and 104. The chains 99 and 100 are connected with each of the batteries 7 of nozzles as by link pivots 105. The link pivots 105 are rigidly secured to members 106, which, in turn, are rigidly secured to bearing bracket 90. Sprockets 101 and 102 are pinioned to shaft 107 journaled in hub bearing 108 rigidly secured to member 78. Sprockets 103 and 104 are pinioned to shaft 109 journaled in hub bearing 110 rigidly secured to member 78. Shaft 107 is driven by power transmitted from motor 111 through gear train comprising belt 112, wheel 113, wheel 114, belt 115, wheel 116, sprocket 117, chain 118, sprocket 119, shaft 120, sprocket 121, chain 122, and sprocket 123. The drive means just described is best shown in Figures 5 and 8.

Belt 112 is driven direct from motor pulley 124. Wheels 113 and 114 are pinioned to stub shaft 125 journaled in suitable bearings mounted in framework 11. Wheel 116 and sprocket 117 are pinioned to stub shaft 126 journaled in suitable bearings mounted in framework 11. Sprockets 119 and 121 are pinioned to shaft 120. The shaft 120 passes through fixed column 8 and is journaled in suitable bearings mounted therein. The sprocket 123 is pinioned to shaft 107.

Collar 21 is rotated in synchronism with the movement of the batteries 7 of nozzles by power transmitted from shaft 126 through the medium of sprockets 127 and 128 and chain 129. Sprocket 127 is pinioned to shaft 126 and sprocket 128 is rigidly secured around collar 21.

In operation, the plastic material is continuously carried under pressure from a source not shown to each of the nozzles 44 through line 20, annular space 17, outlet 19, annular groove 22, outlets 61 and main lines 54, 55, 56 and 57, and branch lines 58, 59 and 60. Also, the batteries 7 of the nozzles are continuously carried in the elliptical space between tracks 42 and 43 as defined by the elliptical path 3. Thus continuous strands of the plastic material are extruded from means travelling in an elliptical path. The curved ends of the extruded strands are separated from the straight portions of the strands by heated wires 4 provided at either side of conveyor 1. The separated curved ends of the extruded strands fall into hopper 6, whence they are returned to the melting kettle and again used without further processing. The straight portions of the extruded strands are deposited onto the conveyor 1 and are carried through the drying zone.

From the description of the machine given above, it will be apparent that the material falling from the extruding nozzles will be laid upon the conveyor starting progressively from one side toward the other. As the nozzle moves across one of the straight portions of the elliptical path, the conveyor will move out from under the nozzle thus causing the strand to be laid at an angle approximating but not quite at right angles to the path of the conveyor.

As shown in Figure 1, even though the groups or series of strands are deposited on the conveyor 1 at an angle other than at right angles to the path of its movement, the series may be so laid that they do not interfere with each other. This is accomplished, by spacing the extruding nozzles around the rail in a manner, to cause the groups of strands deposited on the conveyor when the nozzles travel across the first straight portion of the elliptical path to be spaced widely enough apart so that there will be no overlapping when the next series of strands are laid on the conveyor as the nozzles travel across the second straight portion of the elliptical path. The nozzles may be spaced and the speed of the conveyor may be controlled so that the groups of strands form the zigzag pattern of Figure 1 without the strands overlapping.

Referring to Figure 1, one example of a manner of designing the construction to get the zigzag pattern there shown is as follows: If the path has the dimensions indicated, each straight portion of the elliptical path is equal to M and the curved paths 3 are each equal to Q. The total length of the elliptical path is therefore 2M plus 2Q. The nozzle traverses the straight path A as the conveyor moves continuously below the elliptical path and the strands will therefore be displaced at a distance N from a line disposed at exactly right angles to the path of movement of the conveyor. From the relationship of the distance N to the distance M, the relative speed of the conveyor and nozzle may be determined. Once having determined this factor, the length of the entire elliptical path 2M plus 2Q can be selected so that the groups B may be laid on the conveyor at the desired distance apart, namely O, i. e. it will take a definite time for the nozzle to traverse the elliptical path and the path can be designed to be of sufficient length to permit the conveyor to advance a predetermined distance before the nozzle completes one trip around the path. Knowing the distance M, the length of the curve portions Q can be calculated after the entire length of the path is determined.

Once having placed the groups of strands B on the conveyor in the desired spaced relation, it is then necessary to place the groups of strands D on the conveyor between the groups B. Considering points $x$ and $y$ on the conveyor, it will be seen that the nozzle must travel across the conveyor, around the curve, and back across the conveyor, to get from one point to the other. Knowing the velocity of nozzle travel and the distance it travels, the time it takes the nozzle to get from $x$ to $y$ can be computed. The distance the conveyor travels in this time can be determined from its velocity which is known and the curve 3 must then be directed to bring the nozzle back across the conveyor along return path C a distance far enough along the path of the conveyor to place the group of strands D on the conveyor with the end strand of the group occupying the point $y$. The curve must have a length equal to Q and if the nozzle is brought back across the conveyor to lay group D immediately next to the group B which has just been placed on the conveyor, the elliptical path cannot be followed. Therefore, as shown in Figure 1 it is preferred to simplify the construction by making the path substantially elliptical and to accomplish this the nozzle is returned across the conveyor at a point spaced forwardly a convenient multiple of the distance O plus the calculated conveyor movement that takes place while the nozzle moves from point $x$ to point $y$. The points $x$ and $y$ may be selected to have a clearance equal to P therebetween in order that the groups of strands will not be overlapped.

The above example explains how a single nozzle and the conveyor may be co-ordinated to operate without placing the strands on the conveyor in overlapping relationship. If it were desirable to use two nozzles it would be necessary only to make the elliptical path 2M plus 2Q twice as long and dispose the nozzles 180° apart to get the same results shown in Figure 1. While this in effect would cause the nozzles to cross the conveyor exactly as if one nozzle were being used, a possible advantage would arise from using two nozzles in that if one of the nozzles became clogged the machine could continue in operation with the remaining nozzle to fill up at least one-half of the conveyor. This advantage would be multiplied as additional nozzles were added to the machine and any number of nozzles may be so provided. With two nozzles, the dimension M of the elliptical path over the conveyor would remain the same and only the length Q of each of the curved paths 3 would be increased to accomplish the desired lengthening and the speed of nozzle movement would remain the same as if one nozzle were being used.

Figure 2:
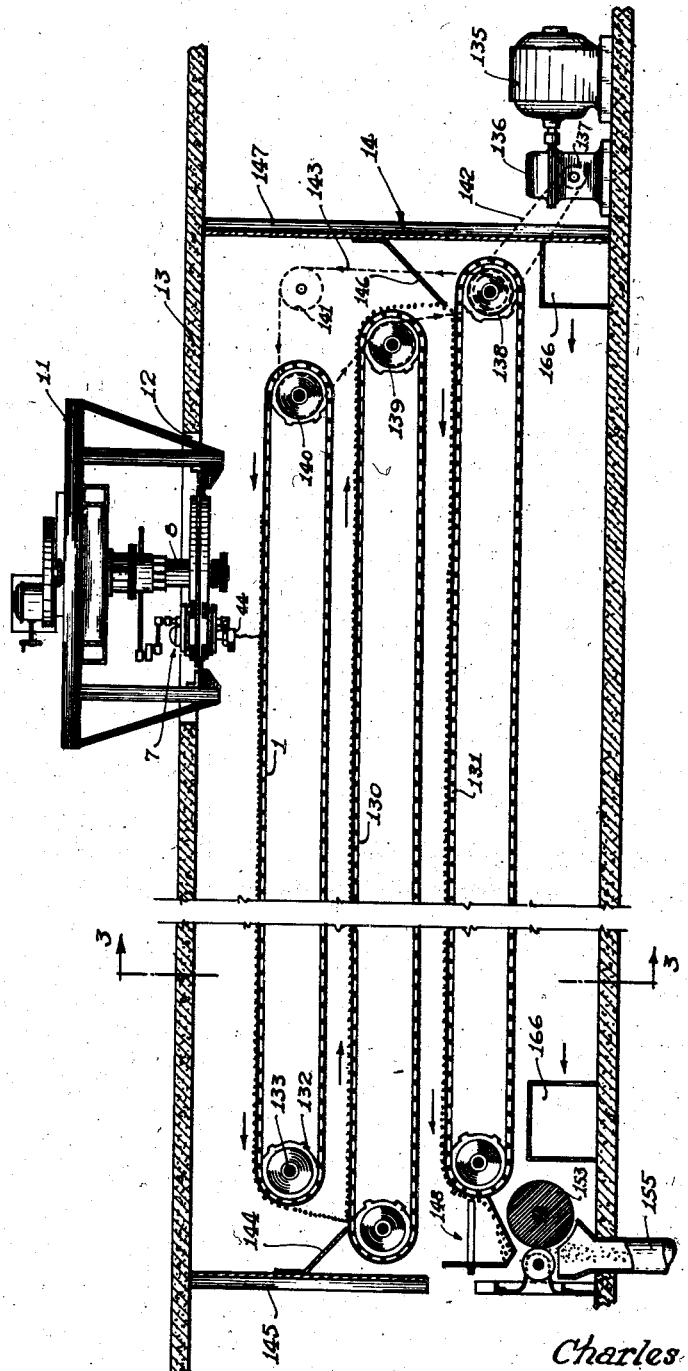
Figure 2 is a side view, partly in section, showing the device of the present invention.

As disclosed above, the strands are deposited or laid on conveyor 1 to be carried through the drying zone and as shown in Figures 2 and 3, the drying apparatus embodies a series of conveyors 1, 130 and 131, mounted on sprockets 132 pinioned to shafts 133 journaled in suitable bearings mounted within the side walls 134 of drying chamber 14. Conveyors 1, 130 and 131 are alternately driven in opposite directions by power transmitted from motor 135 through the medium of gear box 136, sprockets 137, 138, 139, 140 and 141, and chains 142 and 143, mounted in the manner shown in Figure 2.

The strands of material at the end of their travel on conveyor 1 are shunted onto conveyor 130 by apron 144 secured against end wall 145 of drying chamber 14, and at the end of their travel on conveyor 130 are shunted onto conveyor 131 by apron 146 secured against the end wall 147 of drying chamber 14.

The strands of material at the end of their travel on conveyor 131 are deposited into receiving hopper 148, comprising inclined bottom 149 and pivoted gate 150 provided with latch arm 151. Gate 150 is normally closed against bottom 149 as by spring 167. Conveyor 131 is provided with upwardly extended spaced cleats 152, adapted to periodically contact latch arm 151 and thus intermittently open gate 150.

Figure 14:
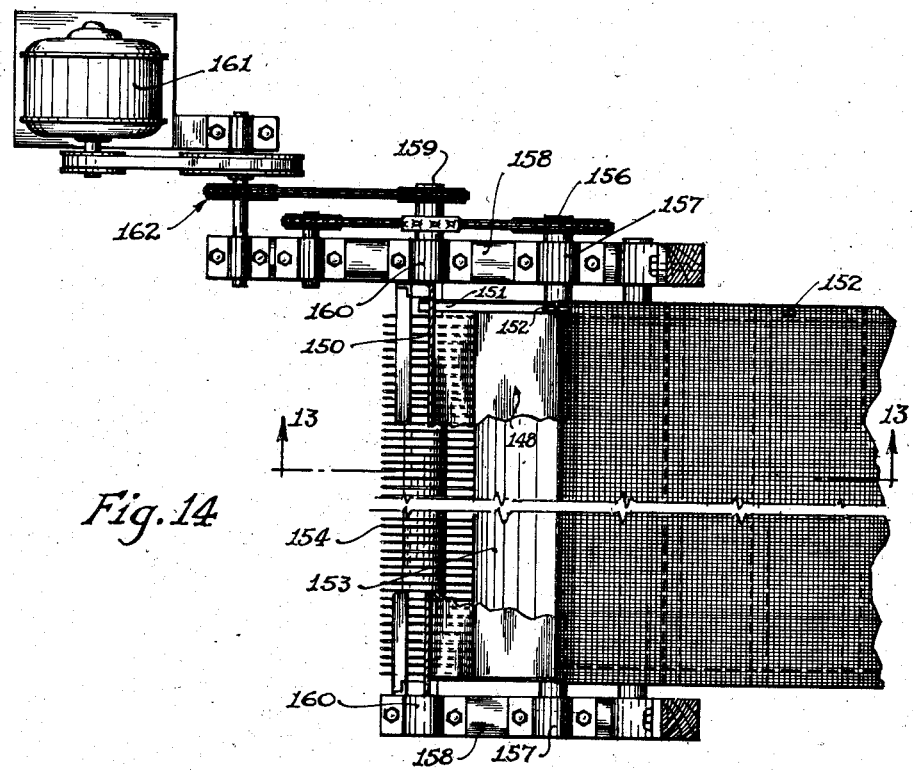
Figure 14 is a plan view of Figure 13.
Figure 13:
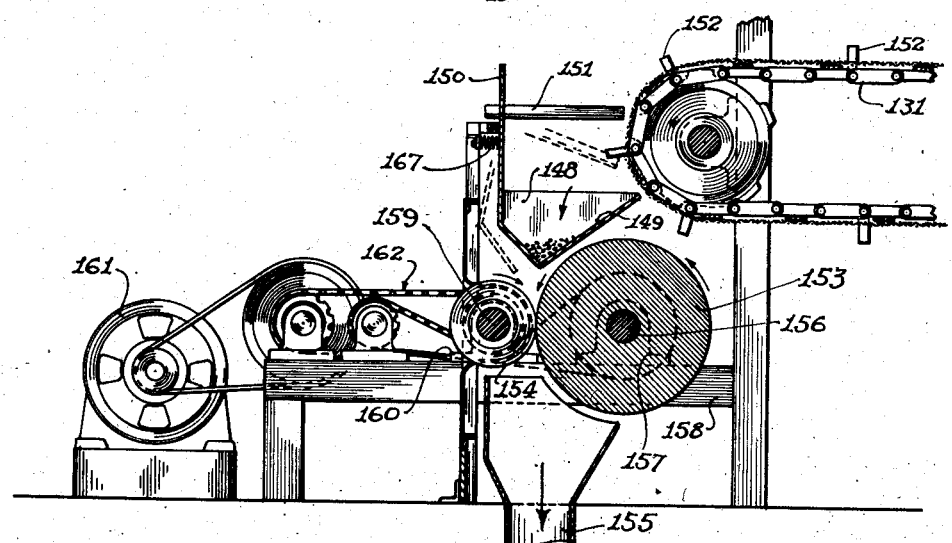
Figure 13 is a side view, partly in section, showing the means for cutting the dried lengths of extruded material.

Gate 150, at each opening, releases a supply of the dried strands, whence they fall between roller 153 and series of spaced knife discs 154. The knife discs 154 are mounted in contactable relation with roller 153 and thus serve to subdivide the dried strands into the desired lengths, whence they fall into chute 155 to a packaging room not shown, ready for packaging. Roller 153 is pinioned to shaft 156 journaled in bearings 157 rigidly secured to suitable framework 158. Knife discs 154 are pinioned in spaced relation on shaft 159 journaled in suitable bearings 160 rigidly secured on framework 158. The roller 153 and knife discs 154 are rotatably driven by power transmitted from motor 161 through the medium of gear train 162, shown in Figures 13 and 14.

Air at a suitable temperature may be supplied to drier housing 14 through the medium of fan blower 163 driven by motor 164, heater 165 and suitable air ducts 166.

I claim:

1. The method of drying material which comprises extruding the material in a continuous strand from a means travelling in a substantially elliptical path having two substantially straight portions joined by curved ends, separating the curved ends from the straight portions of the strand of the material and placing the straight portions of the strand of the material onto a moving conveyor transversely the path of movement of the conveyor.

2. The method of drying material which comprises extruding the material in a continuous strand from a means travelling in a substantially elliptical path having two substantially straight portions joined by curved ends, separating the curved ends from one of the straight portions of the strand of the material and placing the said one of the straight portions of the strand of the material onto a moving conveyor transversely the path of movement of the conveyor and separating the curved ends from the other of the straight portions of the strand of the material and placing the said other of the straight portions of the strand of the material onto the moving conveyor transversely the path of movement of the conveyor.

3. The method of drying material which comprises extruding the material in a continuous strand from a means travelling in a substantially elliptical path having two substantially straight portions joined by curved ends, separating the curved ends from one of the straight portions of the strand of the material and placing the said separated straight portion of the strand of the material onto a moving conveyor transversely the path of movement of the conveyor successively in spaced relation, and separating the curved ends from the other of the straight portions of the strand of the material and depositing the said other separated straight portion of the strand of the material onto the conveyor successively in spaced relation and substantially between said first placed strands.

4. The method of drying material which comprises extruding the material in a series of continuous strands from a single means travelling in a substantially elliptical path having two substantially straight portions joined by curved ends, separating the curved ends from the straight portions of the strands of the material and placing simultaneously the straight portions of said series of strands of the material onto a moving conveyor transversely the path of movement of the conveyor.

5. The method of drying material which comprises extruding the material in a series of continuous strands from a single means travelling in a substantially elliptical path having two substantially straight portions joined by curved ends, separating the curved ends from one of the straight portions of said series of strands and placing simultaneously the separated straight portions of the strands of the material onto a moving conveyor transversely the path of movement of the conveyor and separating the curved ends from the other of the straight portions of the series of strands of the material and placing simultaneously the said other separated straight portions of the strands of the material onto the moving conveyor transversely the path of movement of the conveyor.

6. The method of drying material which comprises extruding the material in a series of continuous strands from a single means travelling around a substantially elliptical path having two substantially straight portions joined by curved ends, separating the curved ends from one of the straight portions of the series of strands of the material and placing simultaneously the separated straight portions of the strands of the material onto a moving conveyor transversely the path of movement of the conveyor, successive separated series of the straight portions of the strands of the material being placed onto the conveyor in spaced relation, and separating the curved ends from the other straight portions of the series of strands of the material and placing simultaneously the said other separated straight portions of the series of strands of the material onto the moving conveyor transversely the path of movement of the conveyor, successive separated other straight portions of the series of strands of the material being placed onto the conveyor in spaced relation, said other straight portions being placed on the conveyor substantially between said first placed straight portions.

7. In combination with a movable drier conveyor, a rail mounted over the conveyor, the rail defining an elliptical path comprising two parallel straight arms joined by curved ends, the straight arms traversing the conveyor transversely the path of movement of the conveyor, an extrusion nozzle movably mounted on the rail, means for continuously moving the nozzle in the path defined by the rail, and means for supplying material to and extruding material from the nozzle.

8. In combination with a movable drier conveyor, a rail mounted over the conveyor, the rail defining an elliptical path comprising two parallel straight arms joined by curved ends, the straight arms traversing the conveyor transversely the path of movement of the conveyor, a battery of extrusion nozzles movably mounted on the rail, means for continuously moving the battery of nozzles in the path defined by the rail, means for supplying material to each of the nozzles, and means for extruding the material through the nozzle.

9. In combination with a movable drier conveyor, a rail mounted over the conveyor, the rail defining an eliptical path comprising two parallel straight arms joined by curved ends, the straight arms traversing the conveyor transversely the path of movement of the conveyor, an extrusion nozzle movably mounted on the rail, means for continuously moving the nozzle in the path defined by the rail, means for extruding the material through the nozzle, means for supplying material to the nozzle, and means for severing the curved ends of the strand of the material from the straight portions of the strand of the material.

10. In combination with a movable drier conveyor, a rail mounted over the conveyor, the rail defining an eliptical path comprising two parallel straight arms joined by curved ends, the straight arms traversing the conveyor transversely the path of movement of the conveyor, an extrusion nozzle movably mounted on the rail, means for continuously moving the nozzle in the path defined by the rail, means for extruding material from the nozzle, means for supplying material to the nozzle, and means comprising a heated wire mounted to each side of the conveyor and extended to either side of the path defined by the rail for severing the curved ends of the strand of the material from the straight portions of the strand of the material.

11. In combination with a movable drier conveyor, a continuous rail mounted over the conveyor and in horizontal alignment therewith, a nozzle movably mounted on the rail for the extrusion of material onto the conveyor, means for continuously moving the nozzle in the path defined by the rail, and means for supplying material to the nozzle comprising a fixed column rigidly secured centrally of the rail, an inlet in the column for the introduction of material under pressure, a material outlet in the column, a collar rotatable on the column, the collar being provided on its inner wall with an annular groove communicating with the column outlet, a material outlet in the collar communicating with the annular groove, and a pipe line connecting the collar outlet with an inlet provided in the nozzle.

12. In combinaion with a movable drier conveyor, a continuous rail mounted over the conveyor and in horizontal alignment therewith, a nozzle movably mounted on the rail for the extrusion of material onto the conveyor, means for continuously moving the nozzle in the path defined by the rail, and means for supplying material to the nozzle comprising a fixed column rigidly secured centrally of the rail, an inlet in the column for the introduction of material under pressure, a material outlet in the column, a liner provided at each of its ends with an annular shoulder having a press fit within the column, the liner providing an annular space connecting the material inlet in the column with the material outlet, a collar rotatable on the column, the collar being provided on its inner wall with an annular groove communicating with the column outlet, a material outlet in the collar communicating with the annular groove, a flexible pipe line connecting the collar outlet with an inlet provided in the nozzle, and means rotating the collar on the column in synchronism with the movement of the nozzle on the rail.

13. In combination with a movable drier conveyor and means for depositing onto the conveyor strands of material transversely the path of movement of the conveyor, a strand receiving bin at the discharge end of the conveyor comprising an inclined bottom, a pivoted gate normally closed against the bottom, a latch arm on the gate and means on the conveyor engageable with the latch arm to periodically open the gate to release from the bin a charge of the dried strands deposited therein.

14. In combination with a movable drier conveyor and means for depositing onto the conveyor strands of material transversely the path of movement of the conveyor, means for subdividing the dried strand lengths comprising a roller and a series of rotatable knife discs contactable against the periphery of the roller, the roller and discs being mounted longitudinally at the discharge end of the conveyor and being adapted to receive therebetween the dried strand lengths discharged from the conveyor.

15. The method of drying material which comprises extruding a plurality of continuous strands of the material from means travelling in an elliptical path having two substantially straight portions joined by curved ends, separating the curved ends from one of the straight portions of each of the strands of the material and placing said separated straight portions of said strands on a moving conveyor.

16. The method of drying material which comprises extruding a plurality of continuous strands of the material from means travelling in an elliptical path having two substantially straight portions joined by curved ends, separating the curved ends from one of the straight portions of each of the strands of the material and placing said separated straight portions of said strands on a moving conveyor, and separating the curved ends from the other of the straight portions of each of the strands and depositing the said separated other straight portions of the strands of the material on the conveyor.

17. The method of drying material which comprises extruding a plurality of continuous strands of the material from means travelling in an elliptical path having two substantially straight portions joined by curved ends, separating the curved ends from one of the straight portions of each of the strands of the material and placing said separated straight portions of said strands on a moving conveyor in spaced relation and transversely of the path of movement of the conveyor, and separating the curved ends from the other of the straight portions of each of the strands and depositing the said separated other straight portions of the strands of the material on the conveyor transversely thereof and in spaced relation, said deposited straight portions being positioned substantially between said first placed strands.

18. The method of drying material which comprises extruding a plurality of series of continuous strands of the material from means travelling in an elliptical path having two substantially straight portions joined by curved ends, separating the curved ends from the straight portions of each of said series of strands of the material and placing said separated series of straight portions of said strands on a moving conveyor.

19. The method of drying material which comprises extruding a plurality of series of continuous strands of the material from means travelling in an elliptical path having two substantially straight portions joined by curved ends, separating the curved ends from one of the straight portions of each of said series of strands of the material and placing said separated series of straight portions of said strands on a moving conveyor, and separating the curved ends from the other straight portions of each of said series of strands and depositing said separated other series of straight portions of the material on the conveyor.

20. The method of drying material which comprises extruding a plurality of series of continuous strands of the material from means travelling in an elliptical path having two substantially straight portions joined by curved ends, separating the curved ends from one of the straight portions of each of said series of strands of the material and placing said separated series of straight portions of said strands on a moving conveyor, in spaced relation and transversely of the path of movement of the conveyor, and separating the curved ends from the other of the straight portions of each of the series of strands, and depositing the said separated other straight portions of the series of strands of the material on the conveyor transversely thereof and in spaced relation, said deposited other straight portions being positioned substantially between said first placed strands.

CHARLES T. WALTER.